United States Patent
Biberstein et al.

(10) Patent No.: US 7,453,910 B1
(45) Date of Patent: Nov. 18, 2008

(54) SYNCHRONIZATION OF INDEPENDENT CLOCKS

(75) Inventors: Marina Biberstein, Haifa (IL); Yuval Harel, Haifa (IL); Andre Heilper, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/958,918

(22) Filed: Dec. 18, 2007

(51) Int. Cl.
*H04J 3/06* (2006.01)

(52) U.S. Cl. .................................... 370/503

(58) Field of Classification Search ......... 370/503–520; 375/354–357; 709/220, 221, 248; 713/375, 713/400, 401, 500–601
See application file for complete search history.

(56) References Cited

U.S. PATENT DOCUMENTS

| | | | |
|---|---|---|---|
| 4,816,989 A | 3/1989 | Finn et al. | |
| 4,816,990 A | 3/1989 | Williams | |
| 5,896,524 A | 4/1999 | Halstead, Jr. et al. | |
| 6,246,701 B1 | 6/2001 | Slattery | |
| 6,574,665 B1 * | 6/2003 | Khotimsky | 709/224 |
| 6,633,835 B1 | 10/2003 | Moran et al. | |
| 6,801,940 B1 | 10/2004 | Moran et al. | |
| 6,807,583 B2 * | 10/2004 | Hrischuk et al. | 719/318 |
| 6,826,752 B1 | 11/2004 | Thornley et al. | |
| 6,963,747 B1 | 11/2005 | Elliot | |
| 7,062,762 B2 | 6/2006 | Krishnamurthy et al. | |
| 7,177,853 B1 | 2/2007 | Ezra et al. | |
| 7,246,054 B2 * | 7/2007 | Szymanski et al. | 703/17 |
| 2001/0034223 A1 | 10/2001 | Rieser et al. | |
| 2002/0194393 A1 | 12/2002 | Hrischuk et al. | |
| 2004/0117682 A1 | 6/2004 | Xu | |
| 2005/0080924 A1 | 4/2005 | Shang et al. | |
| 2005/0265258 A1 | 12/2005 | Kodialam et al. | |
| 2007/0244571 A1 | 10/2007 | Wilson et al. | |

FOREIGN PATENT DOCUMENTS

| | | |
|---|---|---|
| EP | 0473405 A2 | 8/1991 |
| EP | 0747803 A2 | 11/1996 |
| WO | WO 2006/055955 A2 | 5/2006 |
| WO | WO 2007/064490 A1 | 6/2007 |

OTHER PUBLICATIONS

Arvind, K., "Probabilistic Clock Synchronization in Distributed Systems", IEEE Transactions on Parallell and Distributed Systems, vol. 5, No. 5, May 1994, pp. 474-487.

(Continued)

*Primary Examiner*—Dmitry Levitan
(74) *Attorney, Agent, or Firm*—Scully, Scott, Murphy & Presser, P.C.; Suzanne Erez

(57) ABSTRACT

A system and method to synchronize independent local clocks in multi-core processing system are disclosed. A shared counter or a shared memory/file is provided to establish a partial happened-before relationship (e1<e2 in the happened-before order if we know that the event e1 happened before the event e2) and a synchronizer device is utilized to generate a global time of events in threads or processes. The synchronizer device estimates each clock's start time and approximates elapsed time between events in threads or processes by executing an all-pair shortest-path algorithm.

2 Claims, 2 Drawing Sheets

OTHER PUBLICATIONS

Cristian, F., "Probabilistic Internal Clock Synchronization", Distributed Computing, vol. 3, No. 3, Sep. 1989, pp. 146-158.

Johnson, D.B. et al., "Recovery in Distributed Systems Using Optimistic Message Logging and Checkpointing", Proceedings 7th Annual ACM Symposium on Principles of Distributed Computing, 1988, pp. 1-10.

Lamport, L., "Time, Clocks, and the Ordering of Events in a Distributed System", Communications of the ACM, vol. 21, No. 7, Jul. 1978, pp. 558-565.

Mattern, F., "Virtual Time and Global States of Distributed Systems", Parallel and Distributed Algorithms, Proceedings of the International Workshop, 1989, pp. 120-131.

Meier, L., "Internal Synchronization of Drift-Constraint Clocks in Ad-Hoc Sensor Networks", International Symposium on Mobile Ad Hoc Networking & Computing, Proceedings of the 5th ACM International Symposium on Mobile Ad Hoc Networking and Computing, 1994, pp. 90-97.

Olson, A., "Probabilistic Clock Synchronization in Large Distributed Systems", IEEE Transactions on Computers, vol. 43, No. 9, Sep. 1994, pp. 1106-1112.

Ostrovsky, R., "Optimal and Efficient Clock Synchronization Under Drifting Clocks", Annual ACM Symposium on Principles of Distributed Computing, Proceedings of the 18th Annual ACM Symposium on Principles of Distributed Computing, pp. 1-17.

Ramanathan, P., "Fault-Tolerant Clock Synchronization in Distributed Systems", Computer, IEEE Computer Society, vol. 23, No. 10, Oct. 1990, pp. 33-42.

Sichitiu, M. L., "Simple, Accurate Time Synchronization for Wireless Sensor Networks", Wireless Communications and Networking, IEEE, vol. 2, Mar. 16-20, 2003,pp. 1266-1273.

Farnam Jahanian, et al., "Runtime Monitoring of Timing Constraints in Distributed Real-Time Systems", Technical Report CSE-TR 212-94, University of Michigan, Apr. 1994, pp. 1-21.

Robert W. Floyd, "Algorithm 97:Shortest Path", Communications of the ACM, 1962, p. 345, vol. 5, Issue 6, ACM.

David L. Mills, "Network Time Protocol (NTP) General Overview", Aug. 2, 2004, 22 pages.

David L. Mills, "Network TIme Protocol Version 4 Reference and Implementation Guide", Jun. 2006, 90 pages.

David L. Mills, "NTP Architecture, Protocol and Algorithms", Jul. 22, 2007, 26 pages.

David L. Mills, NTP Clock Discipline Principles, Aug. 24, 2004, 14 pages.

David L. Mills, "NTP Performance Analysis", Aug. 24, 2004, 19 pages.

David L. Mills, "NTP Procedure Descriptions and Flow Diagrams" Apr. 16, 2005, 43 pages.

Stephen Warshall, "A Theorem on Boolean Matrices", Journal of the ACM, 1962, p. 11-12, vol. 9, Issue 1, ACM.

* cited by examiner

SYNCHRONIZATION OF INDEPENDENT CLOCKS

BACKGROUND OF INVENTION

1. Field of Invention

The present invention relates to a clock synchronization system and method in a multi-core processing system.

2. Description of the Prior Art

A problem arises, when tracing programs that run on a multi-core machine having a plurality of processing cores where clocks on each core are not synchronized. This absence of consistent time across the processes complicates program debugging, performance analysis, and visualization. For example, the problem arises in the following situations:

At runtime, at each point, each process has access to a clock, but not all processes have access to the same clock.

Processes may switch to a different clock without being aware of it, though the information about the switch will be available elsewhere in the system. Some cores cannot run background processes. A partial "happened-before" order can be established between events timestamped by different clocks. (e1<e2 in the happened-before order, if we know that event e1 happened before the event e2.)

In the above situations, data generated on different cores comes timestamped with independent timestamps: if event E1 is timestamped with time t1, and event E2, coming from a different core, is timestamped with t2, by comparing t1 and t2, one cannot determine which event occurred first and how much time later the second event occur The problem of synchronizing clocks has been addressed by Lamport's Virtual Time ("Time, Clocks, and the Ordering of Events in a Distributed Systems", By L. Lamport, communications of the ACM 21(7), 1978) and Network Time Protocol. In the Lamport's Virtual Time, event ordering is derived from the semantics of events (send must occur before receive). But, the distance (elapsed times) between events are defined arbitrarily in Lamport's algorithm. Therefore, it is not sufficient for performance analysis and visualization. The Network Time protocol is an example prior art algorithm used to synchronize clocks running on different machines as an on-line process. This protocol is based on a server device sending out time signals caught by background processes running on the client nodes. Therefore, it cannot be used with the cores that cannot run background processes.

It would be desirable to provide a system and a method for synchronizing for independent clocks that overcomes addressed drawbacks.

SUMMARY OF THE INVENTION

The above disadvantages or drawbacks have been eliminated by the present invention, which includes a processing system to perform synchronization of independent local clocks comprising:

a multi-core processor having a plurality of processing cores, the multi-core processor having processes running on the processing cores, wherein each process is executed based on each different core, the processing cores having local clocks;

an event tracing component to record events occurring on the each core, to record timestamps of events according to the local clocks, and to record event data to establish a partial happened-before relationship of the events across the processing cores; and an off-line clock synchronizer to establish constraints on the start times of the clocks based on the timestamps and the partial happened-before relationship, to execute an all-pairs shortest-path algorithm on the constraints, while repeatedly relaxing the constraints until no negative cycles is found, to calculate transitive closure of the constraints to improve the constraints, to calculate elapsed times between local clocks' start times based on the transitive closure of the constraints, to assign global timestamps to local clocks' start times based on the elapsed times, and to assign global timestamps to the events based on the global timestamps of the clocks' start times and the timestamps of the events, wherein the assigned global timestamps of the clocks' start times and the assigned global timestamps of the events are used to facilitate one or more of: program debugging, performance analysis and visualization of the processing system.

As another embodiment of the invention, there is provided a method to perform synchronization of independent local clocks governing processes executed by independent processing cores in multi-processing system comprising:

(a) detecting events generated at local processing cores;

(b) recording local timestamps of events based on clocks upon detecting the events;

(c) optionally establishing happened-before relationship by utilizing a shared resource;

(d) deriving a set of constraints on the clocks' relative start time by using the local timestamps and the happened-before relationship;

(e) executing an all-pairs shortest-path algorithm to improve the set of constraints;

(f) if a negative cycle is found while executing an all-pairs shortest-path algorithm, relaxing the set of constraints;

(g) repeating step (f) until there is no negative cycle;

(h) based on resulting constraints from the all-pairs shortest-path algorithm, calculating elapsed times between the clocks' start times;

(i) assigning global timestamps to the clocks' start times based on the elapsed times; and (j) assigning global timestamps to the events based on the local timestamps and the global timestamps of the clocks' start times, wherein the assigned global timestamps of the clocks' start times and the assigned global timestamps of the events are used for one or more of: program debugging, performance analysis, and visualization.

It is therefore a primary object of the present invention to use a resource (in the case of Cell processor, the main memory) that can be accessed with a low overhead by all monitored nodes. The resource is used to establish a partial happened-before relation between events. Alternatively, such a relation may be established, for example, from knowledge of the event semantics (e.g., a message must be sent before it can be received). This relation is used to derive bounds on relative clock start times. Those bounds are incrementally refined until a fixed point is reached, and then used to generate a synchronized timestamps. The precision of this timestamp depends on the temporal proximity of the events, which are used for synchronization.

The proposed system and method do not require cooperation at runtime between different nodes, making it applicable to non-preemptive environment such as Cell processor's SPE (Synergistic Processing Element: a type of Cell processor's cores). It has very low runtime overhead and code space requirements. It is completely offline, so that the time synchronization overhead happens completely during post-processing. It can recover from errors due to imprecision in local time measurements and differences in the cost of accessing the synchronizing resources.

DETAILED DESCRIPTION

Figure 1:
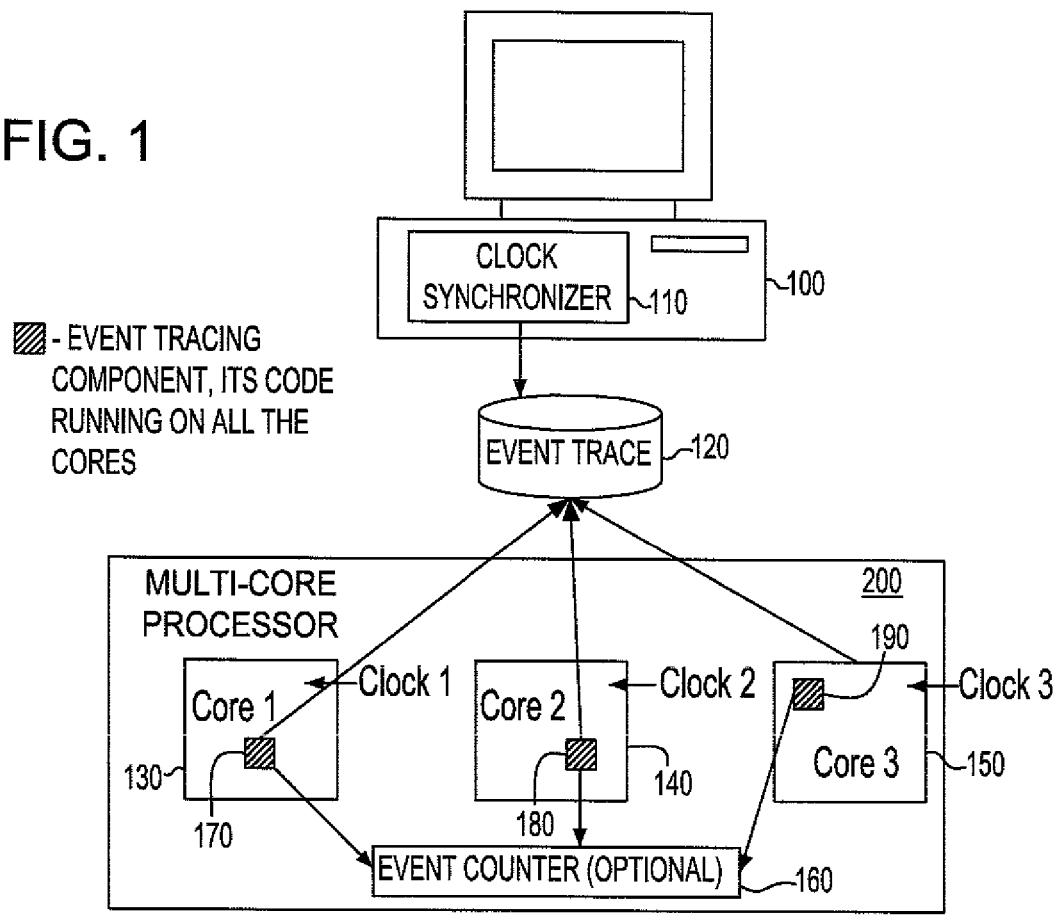
FIG. 1 is a multi-core processing system that utilizes the clock synchronization scheme of the present invention.

As an example embodiment in which the present invention is implemented is a multi-core processing system shown in FIG. 1. FIG. 1 shows three processing cores, 130, 140, and 150, executing processes that generate events. However, the present invention is not limited to three cores, but it can be a plurality of cores. Each core, e.g. 130, 140, or 150, receives each different local clock and includes an event tracing component, e.g., 170, 180, or 190. The event tracing component records events occurring each core in an event trace 120 and records event data, e.g. a shared counter value (the shared counter will be described later.) in event trace 120. Timestamps are recorded in event trace 120 by the event tracing components in the cores for each event, based on the clock that is used at the time at the core where the event occurred. The events generated include, but are not limited to, a library event such as a call to a library function. Anything that affects program behavior/status or system state can be considered as an event. A shared resource, e.g. a shared counter, shared memory, or shared file, is an implementation choice for recording a partial "happened-before" relationship. The shared event counter 160 accessed by event tracing components stamps each received event with event identifier (ID) to establish partial "happened-before" relationship. In another embodiment, it is possible to record all the events into same buffer in the shared memory or file to establish partial "happened-before" relationship. The clock synchronizer 110 reads event data, e.g. a shared counter value, from the event trace 120, estimates each local clock start time and approximates elapsed time between the events using an all-pairs shortest-path algorithm such as Floyd-Warshall algorithm, as will be explained in greater detail below. The clock synchronizer 110 can run on the multi-core processor 200 or on a different computer, e.g., 100.

Figure 2:
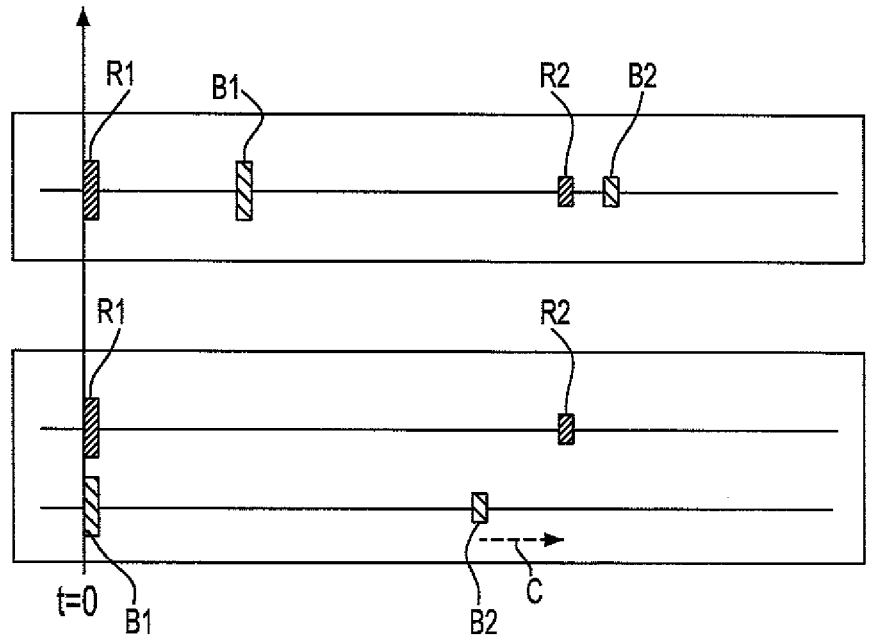
FIG. 2 depicts an example scenario of clock start constraints for two processors for processing according to the present invention.

Considering an example scenario shown in FIG. 2, there is depicted in the top part 5 of the FIG. 2, a first horizontal line representing the actual (runtime) time axis, growing from left to right. R1, which is associated with a first local clock, shows start time of R clock, and R2 shows the time of an event stamped with an R-clock timestamp. Similarly, B1, which is associated with a second local clock, indicates start time of B clock. B2 indicates the time of an event logged with that a B-clock timestamp.

In the bottom part 6 of FIG. 2, the horizontal lines are time axes, again growing from left to right. The location of the timestamp recordation is the data based on timestamps in the log. However, since it is known that R2 event occurred before B2, it is known that B2 timestamp must be shifted to the right at least by the length of the dotted vector C.

Figure 3:
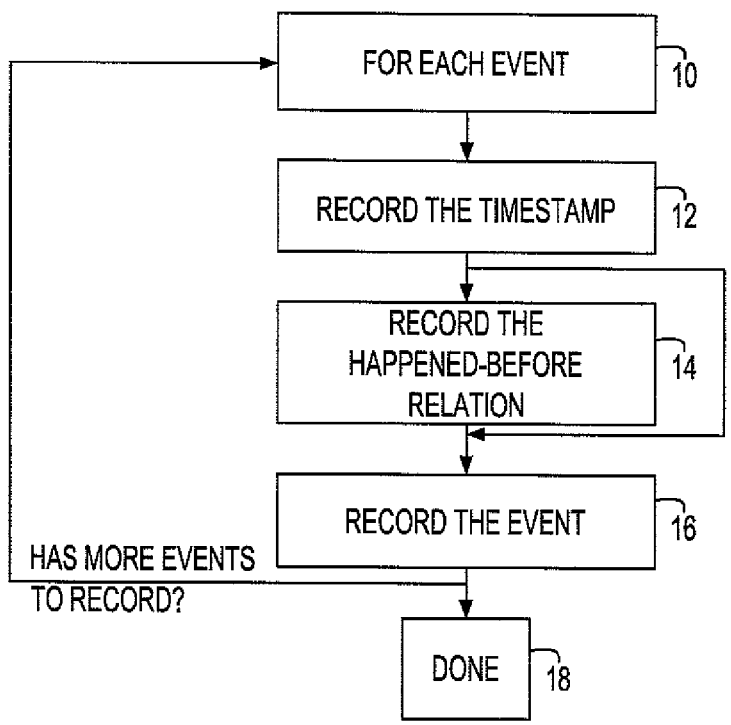
FIG. 3 is a flow chart depicting a trace (timestamp and happened-before relationship) generation diagram in accordance with the invention.
Figure 4:
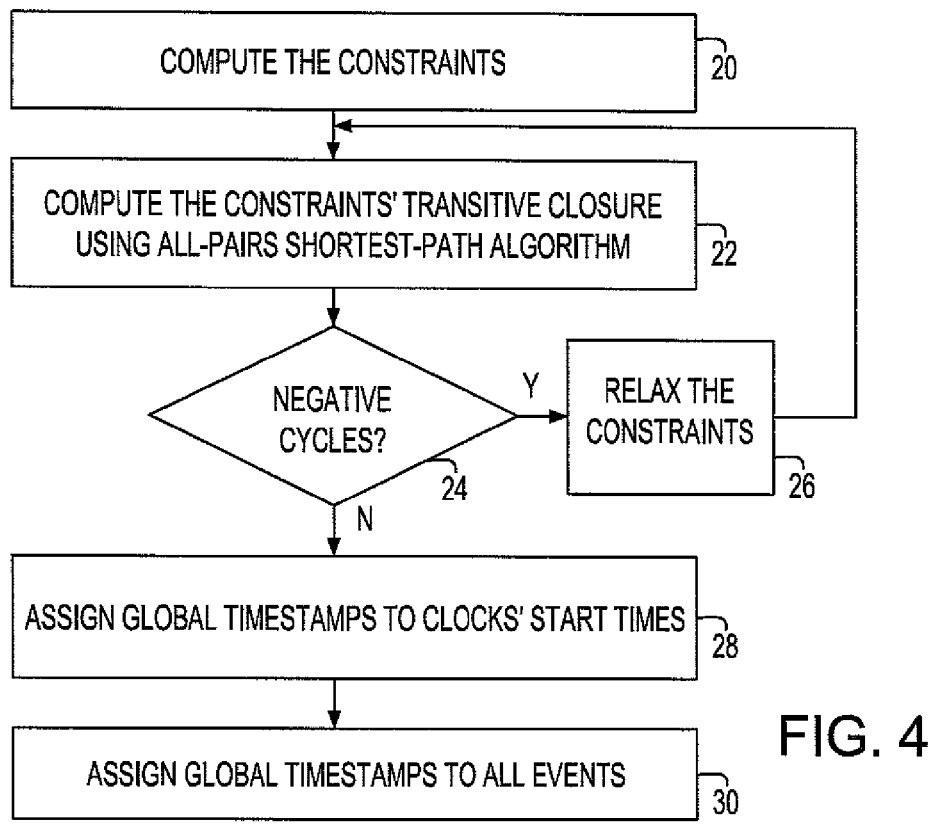
FIG. 4 is a flow chart depicting a trace processing diagram in accordance with the invention.

FIGS. 3-4 is a flow chart depicting the methodology of the present invention. Especially, FIG. 3 shows the trace (timestamp and happened-before relationship) generation for each event. FIG. 4 shows the trace processing. At step 12 in FIG. 3, the core, where the event occurred, records each event's local timestamp according to its local clock. At step 14, a shared counter stamps each event with event ID to establish happened-before relationship of the events. Cores record values of the shared counter, which is incremented automatically. As another embodiment, the events are recorded in a single buffer in a shared memory to establish happened-before relationship of the events. Step 14 is optional implementation. Step 14 can be bypassed for some events. At step 16, all the event data is recorded in event trace 120. The step 12 to 16 is repeated for each event to record timestamp and the happened-before relationship.

Based on the local timestamps and recorded happened-before relationship, step 20 in FIG. 4 computes an initial set of constraints on clocks' relative start times. At step 22, an all-pairs shortest-path algorithm improves those constraints on clocks' relative start times by computing the constraints' transitive closure. If a negative cycle is found while running the all-pairs shortest-path algorithm, at step 26, the constraints are relaxed by adding |weight of the negative loop|/2 (If there are several negative cycles, take the one with largest absolute value of weight) to all constraints. If the all-pair shortest-path algorithm successfully completes, it generates an output, which is a constraint set that is the transitive closure of the original constraints. Based on the output, at step 23, global timestamps are assigned to clocks' start times so that all the constraints are satisfied. At step 30, based on the local timestamps of events and the global timestamps of clocks start times, global timestamps are assigned to events.

For some events, the partial "happened-before" relationships may not exist. For example, if a buffer in a shared memory is used to record order of events, it may happen that some events are written to a different buffer. Then, ids of clocks and local timestamps of events exist, but the partial "happened-before" relationships do not exist. Such events that did not establish the partial "happened-before" relationships do not derive constraints on clock's relative start time. In other word, steps 20-28 in FIG. 4 are skipped for such events. Step 30 in FIG. 4 is performed based on such events' clock ids and local timestamps of the events.

In operation, the clock synchronizer of the present invention receives a set of event records E such that for each event record e in the set E the following information available:

id(e)—unique event id. When an event occurs and is being recorded, it uses a shared resource (e.g. a shared memory) to acquire this id. There are several possible implementations for shared id mechanism: for example, by reserving location in a shared log buffer, or using a shared counter. The only requirement from the shared id mechanism is that if e1 acquires its id before e2, then id(e1)<id(e2). Without loss of generality, it is assumed that the ids of events in E are 0, 1, ..., |E|−1 clock(e)—id of the clock used to timestamp the acquisition of id by e. Without loss of generality, it is assumed that clock ids are 0, 1, ..., C.

time(e)—time (according to clock(e)) at which id(e) was acquired. Without loss of generality, it is assumed that (1) each clock's time is monotonically increasing, i.e., if clock(e1)==clock(e2) and id(e1)<id(e2), then time(e1)<time(e2), and (2) each clock's time starts at 0, i.e., if e is the first event with a given clock (clock(e1) A==clock(e)⇒ id(e1)>id(e)), then time(e)=0.

The goal is to map the events on a global time axis, i.e., to provide a function globaltime(e) such that
    if clock(e1)==clock(e2),
then globaltime(e1)−globaltime(e2)=time(e1)−time(e2)
    if id(e1)<id(e2),
then globaltime(e1)<globaltime(e2)

The algorithm implemented by the clock synchronizer performs as follows:

Use the < relationship (e1<e2, if e1 occurred before e2) and timestamps to compute constraints on clock start times Improve upper bounds on clock start times using an all-pairs shortest path algorithm such as Floyd-Warshall (FW). It is understood that other all-pairs shortest path algorithms could be used instead of Floyd-Warshall.

If no solution exists (negative cycles in FW), compute clock imprecision, correct for it and re-compute the bounds Generate a solution To generalize the algorithm, let T(i) denote the globaltime value of the first event with clock i. The method and system to perform clock synchronization computes T(i)'s as follows:

Build a (C+1)×(C+1) "bounds matrix" U. Each entry of U will hold an upper bound on the difference between corresponding clock's globaltime values: U(i,j)=T(i)−T(j). U is constructed as follows:

Initially, all U(i,j) are set to infinity

For each e1, e2 in E such that id(e1)=id(e2)−1 and clock (e1) !=clock(e2), set U(clock(e1), clock(e2))=min(U(clock (e1), clock(e2)), time(e2)−time(e1))

Next, the bounds in U are transitively improved, using the fact that if U(i,j)=T(i)−T(j) and U(j,k)=T(j)−T(k), then U(i, j)+U(j,k)=T(i)−T(j)+T(j)−T(k)=T(j)−T(k), and hence we can improve U(i,k) by setting U(i,k)=min(U(i,k), U(i,j)+U(j,k)). An efficient way to compute this is using the Floyd-Warshall algorithm, by building a directed weighted clique graph size (C+1) with U as the matrix of edge weights, computing the shortest paths, and updating U(i,j) to the weight of the shortest path from i to j.

The cases where Floyd-Warshall fails (producing negative values on the diagonal) are those where time measurements do not agree with the order of ids, due to imprecision in measuring the time, or due to variation in shared resource access time. Matrix with minimal diagonal value −d reveals measurement imprecision of +/−d/2. By adding d/2 to all the entries of U and then running Floyd-Warshall on the resulting matrix, we obtain the solution to the original problem with the best precision allowed by available data.

Finally, the earliest solution is computed from the refined matrix U using T(0)=0, T(i)=max{T(j)−U(j,i)|j<i}. More generally, once for some subset of indices I={0, 1, C}, the global times {T(i)|i in I} are already selected, then for an index j not in I the value of T(j) can be anywhere between max{T(i)−U(i,j)|i in I} and min{T(i)+U(j,i)|i in I}.

Having computed the T(i)s, global times are assigned to all the events as globaltime(e)=time(e)+T(clock(e)), where globaltime(e) is a global time of an event, time(e) is a local time (according to clock (e)) at which local timestamp of the event acquired, T(clock(e)) is a global time of first event with the clock(e).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method to perform synchronization of independent local clocks governing processes executed by independent processing cores in multi-processing system for program debugging, performance analysis, and visualization comprising:
   (a) detecting events generated at local processing cores;
   (b) recording local timestamps of events based on clocks upon detecting said events;
   (c) optionally establishing happened-before relationship by utilizing a shared resource;

(d) deriving a set of constraints on said clocks' relative start time by using said local timestamps and said happened-before relationship;
(e) processing to improve said set of constraints;
(f) if no solution of said set of constraints is found while said processing, relaxing the set of constraints;
(g) repeating step (f) until a solution which satisfies said set of constraints is found;
(h) based on resulting constraints, calculating elapsed times between said clocks' start times;
(i) assigning global timestamps to said clocks' start times based on said elapsed times; and
(j) assigning global timestamps to said events based on said local timestamps and said global timestamps of said clocks' start times.

2. A processing system to perform synchronization of independent local clocks governing processes executed by independent processing cores in multi-processing system for program debugging, performance analysis, and visualization comprising:

means for detecting events generated at local processing cores;
means for recording local timestamps of events based on clocks upon detecting said events;
means for optionally establishing happened-before relationship by utilizing a shared resource;
means for deriving a set of constraints on said clocks' relative start time by using said local timestamps and said happened-before relationship;
means for processing to improve the set of constraints;
means for relaxing the set of constraints, if no solution of said set of constraints is found while said processing;
means for repeating said relaxing the set of constraints, until a solution which satisfies said set of constraints is found;
means for calculating elapsed times between said clocks' start times, based on resulting constraints;
means for assigning global timestamps to said clocks' start times based on said elapsed times; and
means for assigning global timestamps to said events based on said local timestamps and said global timestamps of said clocks' start times.

* * * * *